US012771633B2

(12) United States Patent
Vasudevan et al.

(10) Patent No.: US 12,771,633 B2
(45) Date of Patent: Oct. 20, 2026

(54) RELIABLE TRANSMISSION OF MESSAGES IN PACKET NETWORKS

(71) Applicant: CISCO TECHNOLOGY, INC., San Jose, CA (US)

(72) Inventors: Bharath Vasudevan, Bellandur (IN); Christian Schmutzer, Koenigsbrunn im Weinviertel (AT)

(73) Assignee: CISCO TECHNOLOGY, INC., San Jose, CA (US)

( * ) Notice: Subject to any disclaimer, the term of this patent is extended or adjusted under 35 U.S.C. 154(b) by 58 days.

(21) Appl. No.: 18/905,562

(22) Filed: Oct. 3, 2024

(65) Prior Publication Data

US 2026/0100903 A1 Apr. 9, 2026

(51) Int. Cl.
*H04L 45/24* (2022.01)
*H04L 45/00* (2022.01)

(52) U.S. Cl.
CPC .................................... *H04L 45/22* (2013.01)

(58) Field of Classification Search
None
See application file for complete search history.

(56) References Cited

U.S. PATENT DOCUMENTS

2004/0114922 A1* 6/2004 Hardee ..................... H04J 3/14 398/17
2007/0253327 A1* 11/2007 Saha ....................... H04L 45/00 370/228
2008/0107416 A1 5/2008 Wang
2010/0135291 A1* 6/2010 Martin ................ H04L 12/4662 370/389
2012/0195190 A1* 8/2012 Singh ...................... H04L 45/28 370/225

(Continued)

FOREIGN PATENT DOCUMENTS

EP 1890406 A1 2/2008
KR 20140032913 A * 3/2014 ......... H04L 41/0668

OTHER PUBLICATIONS

"Liu Jing, Sun Shuhe, Ring automatic protection technology in Carrier Ethernet, Apr. 19, 2010, IEEE Xplore, vol. I, pp. 494-495" (Year: 2010).*

(Continued)

*Primary Examiner* — Christopher B Robinson
(74) *Attorney, Agent, or Firm* — Burris Law, PLLC

(57) ABSTRACT

Methods, systems, and computer program products are provided for transmitting data in a packet network. In various embodiments, a method includes: determining, by a first node, automatic protection switching (APS) information associated with the first node; initiating, by the first node, a timer based on the APS information; communicating, by the first node to a second node over the packet network, a first message including the APS information; receiving, by the first node, a second message from the second node, the second message including APS information associated with the second node, the APS information associated with the second node including a priority associated with an APS state of the second node; and selectively synchronizing, by the first node, an APS state of the first node with the APS state of the second node based on the timer and the APS information of the second message.

18 Claims, 6 Drawing Sheets

(56) References Cited

U.S. PATENT DOCUMENTS

| | | | | |
|---|---|---|---|---|
| 2012/0224481 | A1* | 9/2012 | Babiarz | H04L 47/2408 370/230.1 |
| 2013/0128720 | A1* | 5/2013 | Kim | H04L 43/0817 370/221 |
| 2015/0365193 | A1 | 12/2015 | Connolly et al. | |
| 2016/0036622 | A1* | 2/2016 | Ye | H04L 41/0654 370/225 |
| 2016/0149752 | A1 | 5/2016 | Belanger | |
| 2016/0315696 | A1 | 10/2016 | Lee | |
| 2022/0321451 | A1* | 10/2022 | Brissette | H04L 12/12 |
| 2023/0379246 | A1* | 11/2023 | Jiang | H04L 45/566 |

OTHER PUBLICATIONS

European Search Report for European Application No. 25205982.9, dated Nov. 7, 2025, 8 Pages.

* cited by examiner

RELIABLE TRANSMISSION OF MESSAGES IN PACKET NETWORKS

FIELD

The present disclosure relates to message transmissions, and more particularly to methods, systems, and computer program products for coordinating a reliable exchange of messages and synchronization of states over an unreliable packet network.

BACKGROUND

Automatic protection switching (APS) is a network protection mechanism that automatically switches traffic to a backup link of a network when a working link fails or degrades. An APS protocol is used to manage a state of nodes of the network implementing APS protection, such that the nodes are communicating on the same link.

Some packet networks (e.g., Private Line Emulation (PLE)) send APS dedicated packets that carry APS information using, for example, a Simple Two-Way Active Measurement Protocol (STAMP). STAMP runs over Internet Protocol/User Datagram Protocol (IP/UDP) and is commonly used in Segment Routing (SR) networks. This allows for more lightweight and efficient protocols compared to heavy TCP based protocols. Optical transport networks (OTNs) include APS information in signal overhead bytes along with actual traffic. Additionally, in hybrid networks including a packet and an OTN network, a translation between OTN and APS information and STAMP Operations, Administration, and Maintenance (OAM) packets is required.

DESCRIPTION OF THE DRAWINGS

In order that the disclosure may be well understood, there will now be described various forms thereof, given by way of example, reference being made to the accompanying drawings, in which.

Figure 1:
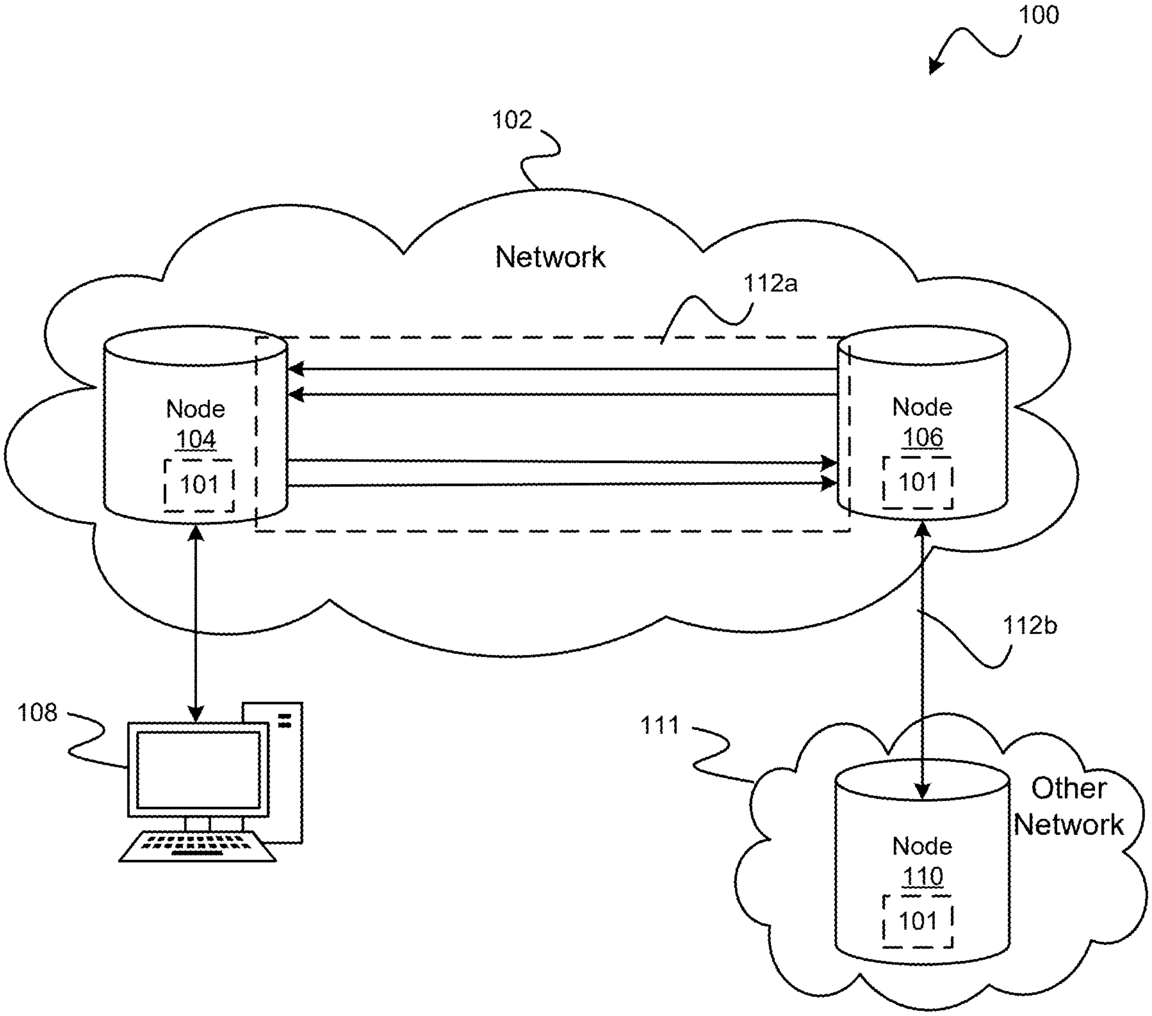
FIG. 1 is a functional block diagram of a network system having a transmission system in accordance with various forms of the present disclosure.

The drawings described herein are for illustration purposes only and are not intended to limit the scope of the present disclosure in any way.

DESCRIPTION OF THE EMBODIMENTS

The following description is merely exemplary in nature and is not intended to limit the present disclosure, application, or uses. It should be understood that throughout the drawings, corresponding reference numerals indicate like or corresponding parts and features. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Overview

As will be discussed in more detail below, methods, systems, and computer program products are provided for transmitting data in a packet network. In various embodiments, a method includes: determining, by a first node, automatic protection switching (APS) information associated with the first node; initiating, by the first node, a timer based on the APS information; communicating, by the first node to a second node over the packet network, a first message including the APS information; receiving, by the first node, a second message from the second node, the second message including APS information associated with the second node, the APS information associated with the second node including a priority associated with an APS state of the second node; and selectively synchronizing, by the first node, an APS state of the first node with the APS state of the second node based on the timer and the APS information of the second message.

DESCRIPTION

With reference now to FIG. 1, an exemplary network system 100 is shown having at least one network 102 including two or more network nodes 104 and 106 that each are configured with a transmission system 101 to allow for APS. The nodes 104 and 106 communicate according to a packet protocol thereby establishing a packet network. For example, the network 102 is a packet network that communicates according to a packet based protocol, such as, but not limited to, Private Line Emulation (PLE) or ethernet.

In some cases, packet transport can be lost in packet networks and hybrid networks. In addition, there is no inherent acknowledgement support built into the STAMP protocol. Accordingly, it is desirable to provide improved methods, systems, and computer program products for exchanging APS information and synchronizing state machines in packet-only and hybrid networks implementing automatic protection switching.

In various forms, the two or more network nodes 104 and 106 are configured as a first edge node communicatively coupled to a second edge node. The first node 104 is referred to as an edge node, as it is configured to couple to other nodes (e.g., non-edge nodes) within the network 102 and to other networks or computing devices 108 outside of the network 102. Likewise, the second node 106 is referred to as an edge node, as it is configured to couple to other nodes (e.g., non-edge nodes) within the network 102 and to other networks 111 via the node 110 or computing devices (not shown) outside of the network 102. In various forms, the other networks 111 are configured as an OTN or other network that communicates according to a protocol that is different than the protocol of the packet network, thereby creating a hybrid network between the nodes 104, 106, and 110. In various forms, the first node 104 and the second node 106 couple within the network 102 with any number of non-edge nodes or other edge nodes arranged according to any of a one to one topology, a ring topology, or a mesh topology therebetween.

In various forms, the couplings or links 112*a*, 112*b* between the nodes 104,106, and/or 110 are configured such that the links 112*a*, 112*b* provide for APS. For example, the link 112*a* between the first node 104 and the second node 106 or the link 112*b* between the second node 106 and the node 110 of the other network 111 can include, for example, two or more connections (as shown in more detail in 112*a*): one or two working connections, and one or two protection connections. Switching between the connections is based on a line state (managed by a local state machine) and may be unidirectional (with each direction switching independently), or bidirectional (where each node negotiates so that both directions are generally carried on the same connections).

In order to achieve reliability in the transmission of data along the links 112, each node 104, 106, 110 is configured with the transmission system 101 that is configured to ensure that, in the event of an APS message being lost between the nodes 104, 106, the node 104, 106 resends or re-communicates the APS information until the edge node recognizes that it has reached a synchronized state with the other node 104, 106, 110. In various forms, this recommunication is controlled by a retry timer which is started by the transmission system 101 of the local node based on a local APS state change and stopped when the transmission system 101 of the local node 104, 106, 110 learns from a received APS message that the other node 104, 106, 110 has moved to the same priority of (or a priority equal to) the state (i.e., state machines are synchronized).

Figure 2A:
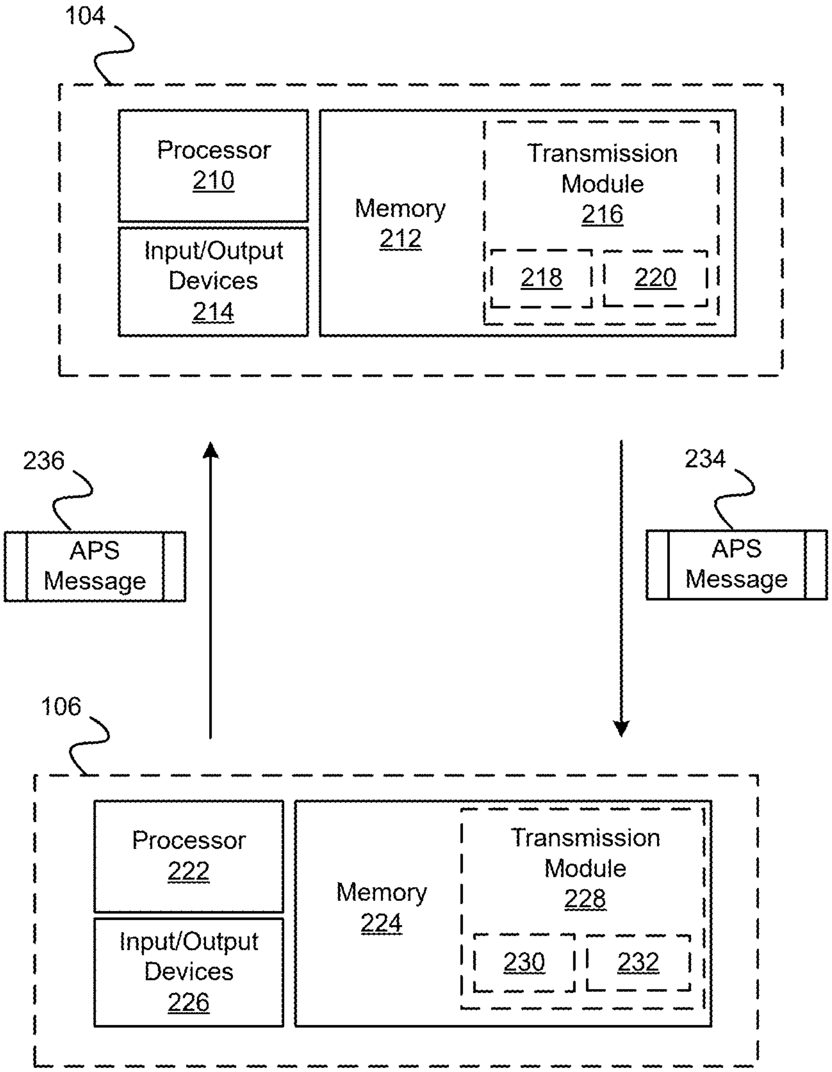
FIGS. 2A and 2B are functional block diagrams illustrating nodes of the network system and having the transmission system in accordance with various forms of the present disclosure.
Figure 2B:
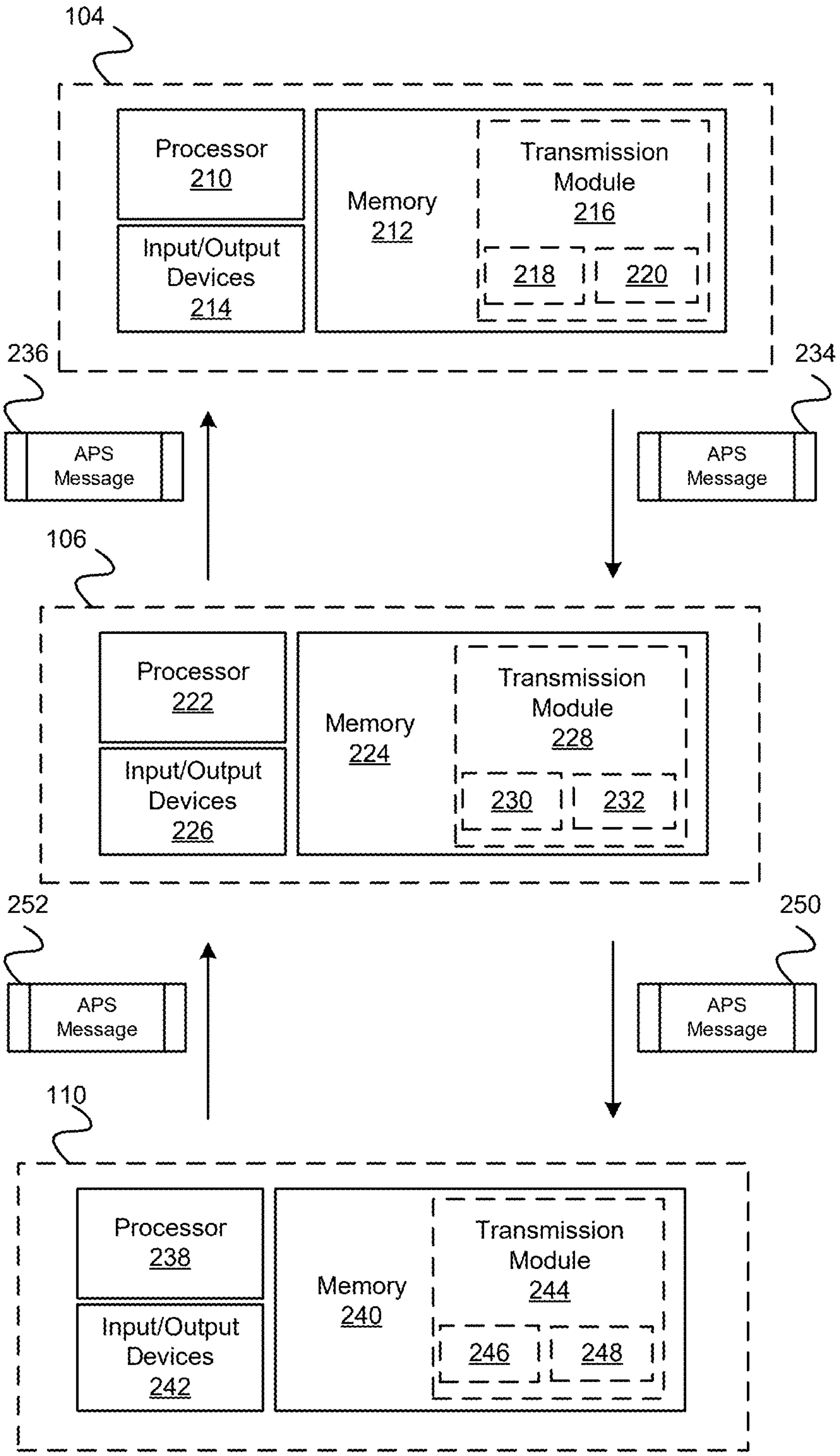

With reference now to FIGS. 2A and 2B and with continued reference to FIG. 1, the nodes 104, 106, and 110 are shown in more detail in accordance with various forms of the present disclosure. FIG. 2A illustrates an embodiment where the node 104 and the node 106 communicate over a packet network. FIG. 2B illustrates an embodiment where the node 104 communicates with node 106 over a hybrid network. As can be appreciated, the internal components and/or configurations of the nodes 104, 106, and 110 may differ from each other in various forms however, for ease of the discussion the nodes 104, 106, and 110 will be discussed in terms of their general components. For example, each node 104, 106, 110 generally includes a processor 210, 222, 238, memory 212, 224, 240 and one or more input/output devices 214, 226, 242, respectively.

In various forms, the processors 210, 222, 238 can be any custom made or commercially available processor, a central processing unit (CPU), a graphics processing unit (GPU), an auxiliary processor among several processors associated with the node 104, 106, 110, a semiconductor based microprocessor (in the form of a microchip or chip set), a macroprocessor, any combination thereof, or generally any device for executing instructions.

The memory 212, 224, 240 is a computer readable storage device or media and may include volatile and nonvolatile storage in read-only memory (ROM), random-access memory (RAM), and keep-alive memory (KAM), for example. KAM is a persistent or non-volatile memory that may be used to store various operating variables while the processor 210, 222, 238 is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processors 210, 222, 238 in operating the respective node 104, 106, 110.

The input/output devices 214, 226, 242 generally include the interface(s) and/or circuitry for communicating via the links 112 of the networks 102, 111, and/or may include interface(s) to mass storage, display devices, data entry devices, and/or the like.

In various forms, the instructions stored in the memory may be embodied in one or more separate programs, each of which comprises an ordered listing of executable instructions for implementing logical functions. The instructions, when executed by the processor, receive and process signals from the input/output devices 214, 226, 242, perform logic, calculations, methods and/or algorithms for automatically operating the nodes 104, 106, 110, and/or generating data to be communicated, for example, as packets on the networks 102, 111.

In various forms, one or more of the instructions are embodied in the transmission system 101 as transmission modules 216, 228, and 244 and, when executed by the processors 210, 222, 238, control local timers 218, 230, 246, maintain APS information 220, 232, 248, and communicate APS messages 234, 236, 250, 252 in accordance with the processes disclosed herein, in order to synchronize the APS states of the nodes 104, 106, 110. For example, the transmission modules 216, 228, and 244 determine, store, and update APS information relating to the node itself (local node) and information relating to the other node(s) (remote node(s)). In various forms, the APS information includes a priority of a local APS state, a working entity, a bridge network type or state (e.g., one to one, etc.), and in some cases, a priority of a remote APS state. The local APS state and/or the remote APS state can include values such as, but not limited to, 1111 Lockout of Protection (LO), 1110 Forced Switch (FS), 1100 Signal Fail (SF), 1010 Signal Degrade (SD), 1000 Manual Switch (MS), 0110 Wait-to-Restore (WTR), 0100 Exercise (EXER), 0010 Reverse Request (RR), 0001 Do Not Revert (DNR), 0000 No Request (NR).

Figure 3:
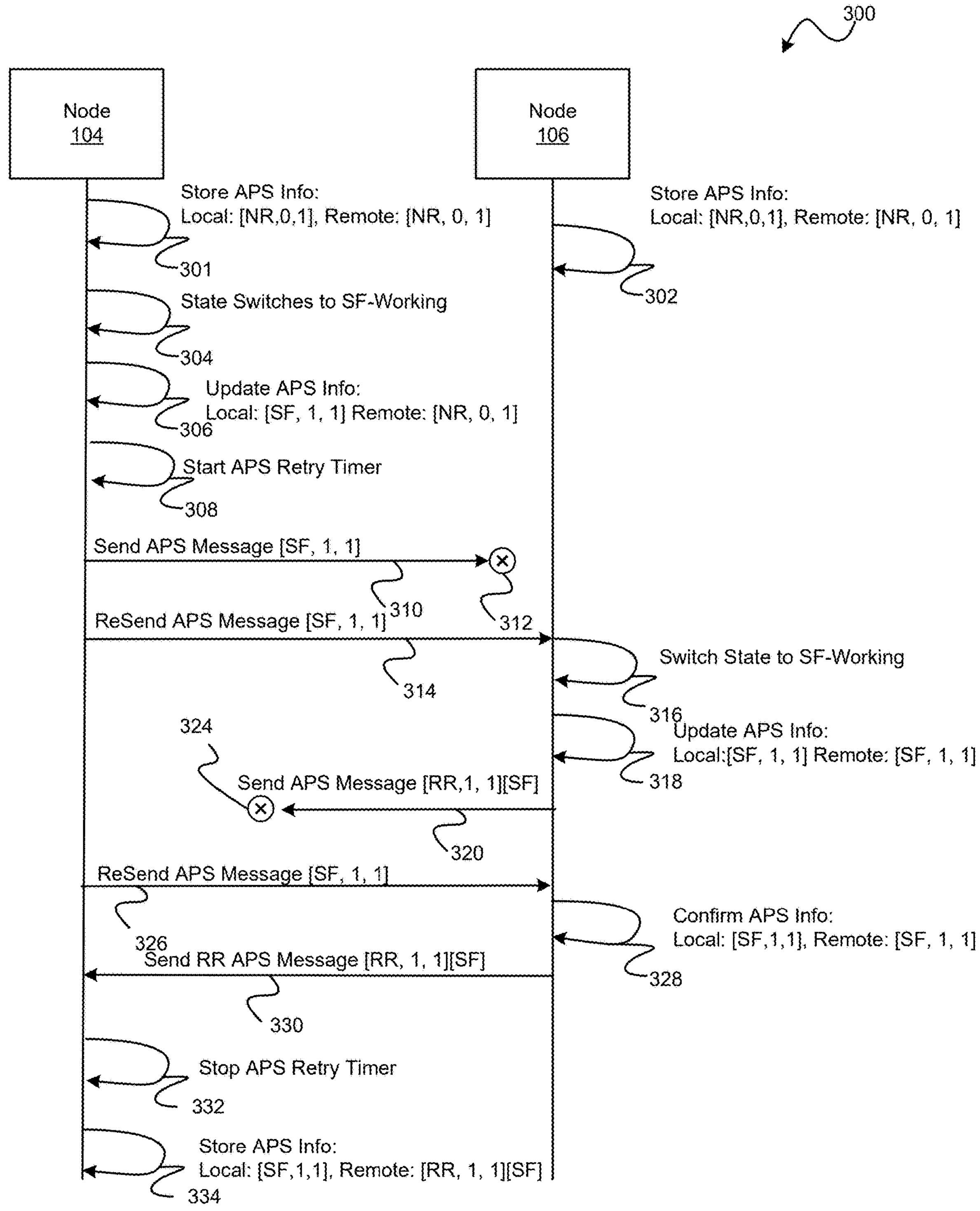
FIGS. 3, 4, and 5 are sequence diagrams illustrating processes performed by the transmission system of the nodes of the network system in accordance with various forms of the present disclosure.
Figure 4:
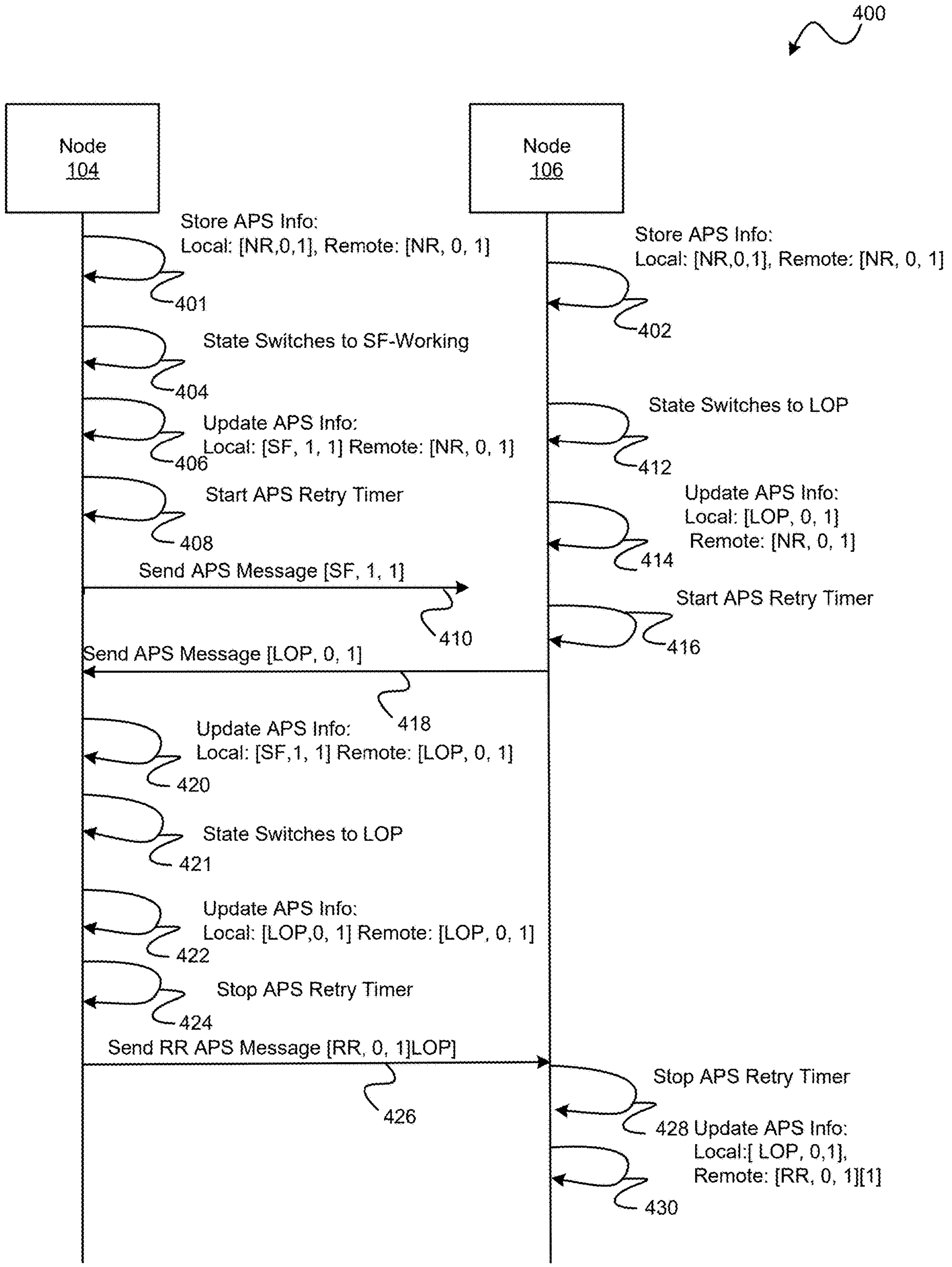
Figure 5:
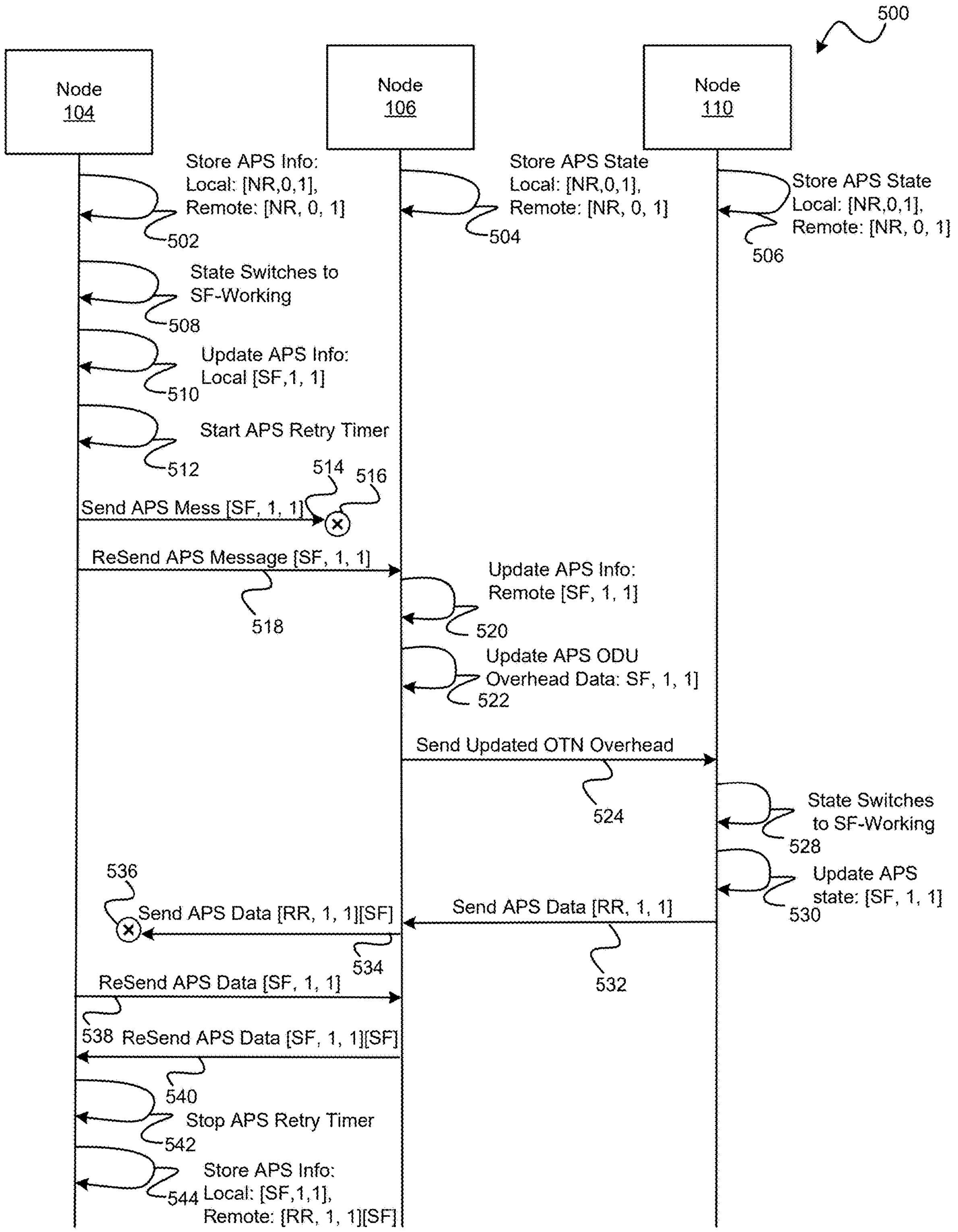

With reference now to FIGS. 3-5 and with continued reference to FIGS. 1 and 2, sequence diagrams illustrate methods or processes 300, 400, 500 that may be implemented by the transmission modules 216, 228, and 244 for exchanging APS messages 236, 234, 250, 252 and synchronizing states between the node 104, and the node 106 and/or the node 110 using the respective timers 218, 230, and/or 246, and APS information 220, 232, and/or 248 in accordance with various embodiments. As can be appreciated, the order of the operations in the processes 300, 400, 500 may vary in various embodiments as the disclosure is not limited to the sequential execution as shown. As can further be appreciated, in various embodiments, one or more operations may be added or deleted without altering the spirit of the processes 300, 400, 500. As can also be appreciated, the values and different states described in the processes 300, 400, 500 can be modified as desired or needed.

FIG. 3 illustrates an exemplary process 300 for communicating APS information between the node 104 and the node 106. The example illustrates when an APS message is lost when being transmitted from the node 104 to the node 106 or being transmitted back from the node 106.

For example, both the node 104 and the node 106 begin with their respective state machine state in a "no request" (NR) state with an APS priority at 11 and the working entity is selected to be 0. The nodes 104 and 106 also have a bridge established state of (1+1). At 301, the node 104 formulates and stores the APS information including [NR, 0, 1] for both the local information and the remote information. Similarly, at 302, the node 106 formulates and stores the APS information including [NR, 0,1] for both the local information and the remote information.

Thereafter, at 304, the node 104 recognizes that the state machine state is changed to SF-Working. The node 104 updates the local APS information to indicate the new state as [SF, 1, 1] at 306 where the priority is updated to 4 indicating signal fail-working, and the entity is updated to 1 indicating protect entity. The node 104 starts the retry timer at 308 and communicates the formulated local APS information as an APS message to the node 106 at 310.

As can be appreciated, this APS message could get dropped in an unreliable transport, for example, as shown at 312. To overcome this, the APS retry timer is used to retransmit this APS message. The APS message is resent until an APS message is received from the node 106 with a corresponding priority of 9 indicating a response or higher (to which the node 104 needs to adhere), or until the timer reaches a threshold.

For example, the node 106, upon receiving the APS message sent at 314, switches to protect state and moves its state to SF-Working at 316. The APS information is updated as [SF, 1, 1] for both the local information and the remote information at 318 (assuming the node 106 has not seen any higher APS priority event than 4, in this period). The node 106 communicates the updated APS information in a response APS message along with the local priority of 4 as [RR, 1, 1][SF] to the node 104 at 320. However, a failure occurs at 324. The node 104 resends the APS message [SF, 1, 1] at 326.

The node 106, upon receiving the APS message sent at 326, confirms the APS information at 328 and sends a response APS message [RR, 1, 1][SF] and 330. The node 104, upon receiving the RR response APS message [RR, 1, 1][SF] from the node 106, which matches the local APS information, stops the retry timer at 332. The APS information is updated for the remote information as [RR, 1, 1][SF] at 334. As can be appreciated, either the APS message from the node 104 or the response APS message from the node 106 could get dropped, in which case, both would be protected with the message retries and the retry timer by the node 104.

FIG. 4 illustrates an exemplary process 400 for communicating APS information between the node 104 and the node 106. The example illustrates when the node 106 enters a lockout of protection state of the state machine. For example, both the node 104 and the node 106 begin with their respective state machine state in a "no request" (NR) state with a priority at 11 and the working entity is selected to be 0. The node 104 and the node 106 also have a bridge established state of (1+1). At 401, the node 104 formulates and stores the APS information including [NR, 0, 1] for both the local information and the remote information. Similarly, at 402, the node 106 formulates and stores the APS information including [NR, 0 1] for both the local information and the remote information.

Thereafter, at 404, the node 104 recognizes that the state machine state is changed to SF-Working. The node 104 updates the local APS information to indicate the new information as [SF, 1, 1] at 406 where the priority is updated to 4 indicating signal fail-working, and the entity is updated to 1 indicating protect entity. The node 104 starts the retry timer at 408 and communicates the formulated local APS information as an APS message to the node 106 at 410.

But before the APS message is received at the node 106 from the node 104, the node 106 recognizes that the state of the state machine of node 106 is switched to a Lockout of Protection (LoP) state with a priority of 1 at 412. The node 106 updates the APS information of the local information to [LoP, 0, 1] at 414 and starts the retry timer at 416. The node 106 formulates and sends the APS message including the APS information [LoP, 0, 1] at 418.

The node 104, upon receiving the higher priority from the node 106, updates the remote APS information to [LoP, 0, 1] at 420. Thereafter, the node 104 is switched to Lockout of Protection (LoP) at 421 and the local APS information is updated to [LoP, 0, 1] at 422. The node 104 stops its own retry timer at 424. The node 104 communicates the updated APS information in a response APS message as [RR, 0, 1][LoP] to the node 106 at 426. The node 106, upon receiving the response APS message [RR, 0, 1][LoP] from the node 104, which matches the local APS information, stops the retry timer at 428. The node 106 updates the APS information for the remote information as [RR, 0, 1][LoP] at 430.

FIG. 5 illustrates an exemplary process 500 for communicating APS information between the node 104, the node 106, and the node 110 in a hybrid network. The example illustrates when the node 106 enters a lockout of protection state in the hybrid network. For example, for a hybrid working model, the overhead bytes and APS messages are translated by the node 106 and the node 106 does not manage a state machine.

In various forms, the node 104, the node 106, and the node 110 begin with their respective state machine state in a "no request" (NR) state with a priority at 11 and the working entity is selected to be 0. At 502, the node 104 formulates and stores the APS information including [NR, 0, 1] for both the local information and the remote information. At 504 and 506, the node 106 and the node 110 formulate and store the APS information including [NR, 0 1] for both the local information and the remote information.

Thereafter, at 508, the node 104 recognizes that the state machine state is changed to SF-Working. The node 104 updates the local APS information to indicate the new state as [SF, 1, 1] at 510 where the priority is updated to 4 indicating signal fail-working, and the entity is updated to 1 indicating protect entity. The node 104 starts the retry timer at 512 and communicates the formulated local APS information as an APS message to the node 106 at 514. The message fails at 516 and the APS message is resent at 518. At 520, the node 106, upon receiving the APS message, updates the APS information for the remote as [SF, 1, 1]. The node 106 updates the overhead byte data to [SF, 1, 1] at 522 and sends the updated overhead data to the node 110 at 524.

The node 110, upon receiving the APS message sent at 524, switches to protect state priority and moves its state to SF-Working at 528. The APS information is updated as [SF, 1, 1] for both the local information and the remote information at 530 (assuming the node 110 has not seen any higher APS priority event than 4, in this period). The node 110 communicates the updated APS information in a response APS message as [RR, 1, 1] to the node 106 at 532 and then node 106 relays the APS message as [RR, 1, 1][SF] to the node 104 at 534. However, a failure occurs at 536. The node 104 resends the APS message [SF, 1, 1] at 538.

The node 104, upon receiving the response APS message [SF, 1, 1][SF] from the node 106 (at 540), which matches the local APS information, stops the retry timer at 542. The APS information is updated for the remote information as [RR, 1, 1][SF] at 544. As can be appreciated, either the APS message from the node 104 or the response APS message from the node 106 or the node 110 could get dropped, in which case, both would be protected with message retries and the retry timers.

As used herein, the phrase at least one of A, B, and C should be construed to mean a logical (A OR B OR C), using a non-exclusive logical OR, and should not be construed to mean “at least one of A, at least one of B, and at least one of C.”

In this application, the term “controller” and/or “module” may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is used as a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for transmitting data in a packet network, comprising:

determining, by a first node, automatic protection switching (APS) information associated with the first node;

initiating, by the first node, a timer based on the APS information;

communicating, by the first node to a second node over the packet network, a first message including the APS information;

receiving, by the first node, a second message from the second node, the second message including APS information associated with the second node, the APS information associated with the second node including a priority associated with an APS state of the second node; and selectively synchronizing, by the first node, an APS state of the first node with the APS state of the second node based on the timer and the APS information of the second message, wherein the timer is initiated in response to a change in the APS state of the first node, and wherein the timer is stopped when the APS state of the first node is synchronized with the APS state of the second node.

2. The method of claim 1, further comprising re-communicating, by the first node to the second node over the packet network, the first message including the APS information based on the timer.

3. The method of claim 1, further comprising stopping, by the first node, the timer based on the APS information of the second node.

4. The method of claim 3, wherein the stopping the timer comprises stopping the timer when the priority associated with the APS state of the second node is equal to a priority of the APS information of the first node.

5. The method of claim 3, wherein the stopping the timer comprises stopping the timer when the priority associated with the APS state of the second node is higher than a priority of the APS information of the first node.

6. The method of claim 1, wherein the APS information of the first node includes a priority associated with the APS state of the first node.

7. The method of claim 1, wherein the APS information of the first node includes a working entity.

8. The method of claim 1, wherein the APS information of the first node includes a bridge state.

9. The method of claim 1, wherein the APS information of the second node includes a priority associated with an APS state of the second node.

10. A system for transmitting data in a packet network, comprising:

a first node within the packet network and configured to, by a processor, determine automatic protection switching (APS) information associated with the first node, initiate a timer based on the APS information, communicate, to a second node over the packet network, a first message including the APS information, receive a second message from the second node, the second message including APS information associated with the second node, the APS information associated with the second node including a priority associated with an APS state of the second node, selectively synchronize an APS state of the first node with the APS state of the second node based on the timer and the APS information of the second message, and re-communicate to the second node over the packet network, the first message including the APS information based on the timer, wherein the timer is initiated in response to a change in the APS state of the first node, and wherein the timer is stopped when the APS state of the first node is synchronized with the APS state of the second node.

11. The system of claim 10, wherein the first node is further configured to stop the timer based on the APS information of the second node.

12. The system of claim 11, wherein the first node is further configured to stop the timer when the priority associated with the APS state of the second node is equal to a priority of the APS information of the first node.

13. The system of claim 11, wherein the first node is further configured to stop the timer when the priority associated with the APS state of the second node is higher than a priority of the APS information of the first node.

14. The system of claim 10, wherein the APS information of the first node includes a priority associated with the APS state of the first node.

15. The system of claim 10, wherein the APS information of the first node includes a working entity.

16. The system of claim 10, wherein the APS information of the first node includes a bridge state.

17. The system of claim 10, wherein the packet network uses at least one of Private Line Emulation (PLE) and ethernet.

18. The system of claim 10, wherein the packet network includes a hybrid network of a packet network and an optical transport network (OTN).

* * * * *